US00RE35497E

United States Patent [19]

Carter, III

[11] E Patent Number: Re. 35,497

[45] Reissued Date of Patent: Apr. 29, 1997

[54] DECORATIVE SIMULATED WHEEL COVER RETENTION SYSTEM

[75] Inventor: George A. Carter, III, 6614 Lakeshore Dr., Garland, Tex. 75042

[73] Assignee: George A. Carter, III, Garland, Tex.

[21] Appl. No.: 340,721

[22] Filed: Nov. 16, 1994

Related U.S. Patent Documents

Reissue of:

[64] Patent No.: 5,188,428
Issued: Feb. 23, 1993
Appl. No.: 655,328
Filed: Feb. 12, 1991

U.S. Applications:

[63] Continuation-in-part of Ser. No. 496,339, Mar. 20, 1990, Pat. No. 5,046,784.

[51] Int. Cl.[6] ..... B60B 7/06

[52] U.S. Cl. ..... 301/37.43; 301/37.31; 301/37.37

[58] Field of Search ..... 301/37.1, 37.24, 301/37.31, 37.32, 37.34, 37.35, 37.36, 37.43, 37.42

[56] References Cited

U.S. PATENT DOCUMENTS

| | | | |
|---|---|---|---|
| 1,304,749 | 5/1919 | Divine | 427/827 |
| 1,861,278 | 5/1932 | Kuniholm . | |
| 1,915,642 | 6/1933 | Arbuckle et al. | 427/287 |
| 1,993,061 | 3/1935 | Hunt et al. | 301/37 |
| 2,016,395 | 10/1935 | Sinclair | 301/37.37 |
| 2,076,789 | 4/1937 | LeJeune | 301/37.37 |
| 2,192,064 | 2/1940 | Pettinati | 301/63 |
| 2,231,183 | 2/1941 | Flandes | 301/63 |
| 2,282,222 | 5/1942 | Goeske | 301/37 |
| 2,291,597 | 8/1942 | Goeske . | |
| 2,386,241 | 10/1945 | Lyon | 301/37 |
| 2,386,243 | 10/1945 | Lyon . | |
| 2,568,430 | 9/1951 | Casabianca | 301/108 |
| 2,621,978 | 12/1952 | Lyon | 301/37 |
| 2,812,215 | 11/1957 | Waite | 301/37 |
| 2,885,245 | 5/1959 | Lyon | 301/37 |
| 2,902,316 | 9/1959 | Black | 301/37 |
| 2,935,361 | 5/1960 | Aske | 301/37 |
| 2,973,226 | 2/1961 | Ellies | 301/37 |
| 3,356,421 | 12/1967 | Trevarrow, Jr. | 301/37 |
| 3,367,720 | 2/1968 | Aske, Jr. | 301/37.42 |
| 3,397,921 | 8/1968 | Aske, Jr. | 301/37.42 |
| 3,481,652 | 12/1969 | Mazerolle | 301/37 |
| 3,528,705 | 9/1970 | Oldroyd | 301/37.1 |
| 3,724,905 | 4/1973 | Kachler | 301/37.42 |
| 3,773,389 | 11/1973 | Foster et al. . | |
| 3,860,295 | 1/1975 | Beisch | 301/37 |
| 3,988,040 | 10/1976 | Spisak | 301/37.39 |
| 4,003,604 | 1/1977 | Connell | 301/37 |
| 4,007,967 | 2/1977 | Buerger | 301/37.39 X |
| 4,054,323 | 10/1977 | Lewis | 301/37 |

(List continued on next page.)

FOREIGN PATENT DOCUMENTS

| | | | |
|---|---|---|---|
| 271381 | 6/1988 | European Pat. Off. | 301/37.36 |
| 1100164 | 9/1955 | France | 301/37 |

*Primary Examiner*—Russell D. Stormer

[57] ABSTRACT

A decorative wheel cover apparatus is disclosed for relatively inexpensively simulating the appearance of a more expensive custom wheel. A wheel cover member, having a contoured body and circular inner and outer rims which accurately simulates the appearance of a custom wheel is removably secured to an ordinary automotive wheel by a unique retention system. The retention system includes a first portion disposed along the back of the wheel cover member, and a second portion preferably adhesively bonded to the wheel directly behind the first portion, with the first and second portions being suited for releasable engagement with one another. Preferably, the first and second portions of the retention system constitute mating rings, the first ring being secured to the outer rim of the wheel cover member and having a plurality of lugs extending therefrom, and the second ring having a plurality of receptacles or slots for receiving and releasably retaining the lugs. A method of installation is included.

66 Claims, 5 Drawing Sheets

U.S. PATENT DOCUMENTS

| | | | |
|---|---|---|---|
| 4,210,367 | 7/1980 | Spisak . | |
| 4,229,047 | 10/1980 | Beisch | 301/37 |
| 4,344,654 | 8/1982 | Apezyniski | 301/37.1 |
| 4,388,771 | 6/1983 | Lalonde | 40/587 |
| 4,678,239 | 7/1987 | Matsushita . | |
| 4,708,398 | 11/1987 | Loren . | |
| 4,738,490 | 4/1988 | Loren | 301/37.33 X |
| 4,889,394 | 12/1989 | Ruspa | 301/37 |

DECORATIVE SIMULATED WHEEL COVER RETENTION SYSTEM

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation-in-part of U.S. patent application 07/496,339, filed Mar. 20, 1990, now U.S. Pat. No. 5,046,784 by the same inventor, entitled: "Wheel Cover Retention System".

BACKGROUND OF THE INVENTION

The present invention relates generally to automotive wheel cover apparatus and, in a preferred embodiment thereof, more particularly provides a simulated custom wheel having a unique retention system for attachment to an ordinary automotive wheel in a manner that allows the simulated wheel to more closely duplicate the appearance of a custom wheel.

A need exists in the automotive industry for a relatively inexpensive wheel cover apparatus which convincingly simulates the appearance of a much more expensive custom wheel. The invention disclosed in my above referenced application provides a unique method and apparatus for simulating the appearance of a custom wheel by employing an inexpensive wheel cover comprising a generally flat annular outer rim and a deeply contoured body portion having a uniquely applied custom wheel pattern painted thereon.

With conventional hubcaps or other types of wheel cover devices, a limitation typically exists in their ability to closely simulate the appearance of a custom wheel. In particular, substantial difficulties have been recognized in creating an inexpensive wheel cover which accurately duplicates the contour of a custom wheel. For the most part, these difficulties stem from the conventional retention systems used to secure the wheel cover device to the automotive wheel.

A common problem with conventional retention systems is that they occupy too much space in a radially inward direction from the outer peripheral edge of the automotive wheel. In order to hide the retention system in a manner simulating a custom wheel, conventional wheel cover devices typically have much wider outer rim portions than do actual custom wheels. The radial bulk of conventional retention systems causes a particular problem when the body portion of the wheel cover device is deeply contoured to more completely simulate a custom wheel. Consequently, wheel covers utilizing conventional retention systems typically do a relatively poor job of simulating both the deep contour and narrow outer rim which are typically characteristic of expensive custom wheels. In fact, the difference in outward appearance between a conventional wheel cover and a custom wheel is quite noticeable, particularly to one skilled in this art.

In addition, it has been difficult to provide a satisfactory means of securing wheel covers to an automobile wheel so as to withstand dynamic roadway forces while being easily removable when necessary. Conventional retention systems used on hubcaps and wheel covers typically include a series of metallic spring clips which, upon being forced into compression, frictionally engage an inner, radially facing surface of the automotive wheel. Such spring clip-based retention systems make the hubcap or wheel cover inordinately difficult to install, as well as being susceptible to unintended disengagement and loss. Hubcaps and wheel covers incorporating conventional retention systems are also frequently stolen, since they are typically easy to remove and include no anti-theft features.

Another common problem with conventional retention systems is that they are typically not well suited for use with most conventional wheel balancing weights. The most common type of wheel balancing weight is the clip-on type, which attaches to the outer peripheral edge portion of the wheel. With most conventional wheel cover retention systems, clip-on weights prevent the wheel cover from fitting flush completely around its perimeter, unless the wheel cover includes an unsightly gap to accommodate the weight. Tape-type wheel balancing weights, which may be positioned radially inwardly of the outer peripheral edge of the automotive wheel, provide an acceptable alternative to clip-on wheel weights in some instances, thus solving this problem. Unfortunately, such tape-type wheel weights cannot be used with many conventional retention systems since such retention systems engage the portion of the wheel occupied by the wheel weight, so that removal of the wheel cover would inadvertently result in removal of the weights.

From the foregoing description of conventional apparatus, it can be seen that it would be highly desirable to provide a relatively inexpensive wheel cover device which accurately simulates a more expensive custom wheel. In simulating a custom wheel, it is particularly desirable for an inexpensive wheel cover device to duplicate the deep contour and relatively narrow peripheral edge portion which are characteristics of custom wheels. It is also highly desirable to provide a retention system which allows the use of ordinary automotive wheels with improved wheel covers which accurately simulate custom wheels. It is further desirable to provide such a retention system which allows the use of wheel balancing weights without adversely affecting the location of the weights or the outward appearance of the simulated custom wheel. It is also desirable to provide a means of securing wheel covers on an automobile wheel to withstand dynamic roadway forces and yet be easily removable. Accordingly, it is an object of the present invention to provide such an improved simulated custom wheel apparatus and retention system.

Additional objects of the present invention are to provide a simulated wheel cover apparatus with an improved retention system which enables the user thereof to easily remove and install the apparatus, while providing a locking feature which significantly reduces the chances of both accidental loss and theft.

SUMMARY OF THE INVENTION

In carrying out principles of the present invention, in accordance with a preferred embodiment thereof, a specially configured plastic wheel cover member is provided which includes a deeply contoured body portion and a relatively narrow outer rim portion, thereby accurately simulating the outward appearance of a custom wheel. This unique wheel cover apparatus, or simulated custom wheel, includes a novel two-part retention system which allows the device to simulate the appearance of a custom wheel to a degree heretofore unknown in the art.

An important feature of the improved retention system is the use of a flexible adhesive, such as silicone rubber adhesive, to permanently bond one part of the retention system to the annular wall portion of an automotive wheel in a manner that will provide a secure bond between dissimilar materials while absorbing dynamic forces encountered by normal usage of the wheel. The retention system part is bonded radially inward from the outer peripheral edge portion of the wheel and the bondable part may include means for centering it on the annular wall portion of the wheel while being bonded to insure that the decorative cover will run true.

The retention system representing a preferred embodiment of this invention utilizes two mating rings arranged in concentric relationship, the first of which is attached to the plastic wheel cover member, with the second ring being secured to the automotive wheel. The first ring, which is removably secured to the outer rim portion of the wheel cover member, includes a plurality of T-shaped lugs extending therefrom in an essentially radial direction. The second ring, being permanently attached to the automotive wheel radially inwardly of its outer peripheral edge portion, has a plurality of receptacles configured to receive and engage the lugs extending from the first ring. The configuration of the lugs and receptacles is such that the wheel cover member may be installed by simply placing it in position so that the lugs are inserted into the receptacles, then rotating the wheel cover member slightly in either direction, with removal being effected by equivalent counter-rotation.

In a preferred embodiment disclosed herein, the first ring is secured to the wheel cover member by a plurality of screws passing through the outer rim portion of the wheel cover member and engaging threaded bosses formed in the first ring. A locking feature may then be incorporated into the device simply by providing a series of holes in the second ring aligned with the threaded bosses of the first ring. One or more of the aforementioned screws may then be selected with a suitable length for extending completely through the threaded boss and into the hole on the second ring. This locking technique prevents the unintended counter-rotation and consequent removal of the wheel cover member from the automotive wheel.

In order to insure proper alignment of the wheel cover member with the automotive wheel, the first and second rings may also be equipped with alignment guides. Such alignment guides preferably take the form of a tab extending from the first ring and a corresponding slot in the second ring, wherein the tab must be inserted into the slot before the lugs and receptacles can be properly engaged. The rings may have cooperating lugs and slotted openings, spaced apart around the circumference in such a manner that the rings can be concentrically mated with the lugs on one ring passing through cooperating slotted openings on the other ring and securely engaged by relative rotation of one ring with respect to the other ring.

The retention system disclosed herein is especially well adapted for use with tape-type wheel balancing weights, which may be placed directly on the second ring or on a radially inwardly facing surface of the wheel. Both embodiments of the retention system disclosed herein allow for repeated installation and removal of the custom wheel cover without disturbing the placement of the tape-type wheel weight.

The preferred retention system disclosed herein comprises a pair of mating rings primarily so that the simulated custom wheel can be utilized with virtually any ordinary automotive wheel. It is contemplated, however, that the receptacles and lugs could also be integrally formed portions of the automotive wheel and wheel cover member, respectively, without departing from the teachings of the present invention.

With the exception of the locking feature described above, the advantages of providing an inexpensive wheel cover which accurately simulates a custom wheel could be obtained by creating a special automotive wheel which includes receptacles as described herein, used in conjunction with a wheel cover member with mating lugs. However, since some of the cost advantage would be lost by providing such a modified wheel, it is also contemplated that the second ring may be used with an ordinary wheel as described above, while the first ring is replaced by lugs integrally formed with the plastic wheel cover member. Any such combination of receptacles and lugs could conceivably provide a positively locking simulated custom wheel as disclosed herein.

BRIEF DESCRIPTION OF THE DRAWINGS

The novel features which characterize the present invention are defined by the appended claims. The foregoing and other objects and advantages of the present invention will hereinafter appear, and for purposes of illustration, but not of limitation, an exemplary embodiment is shown in the drawings.

DETAILED DESCRIPTION

Figures 1, 10:
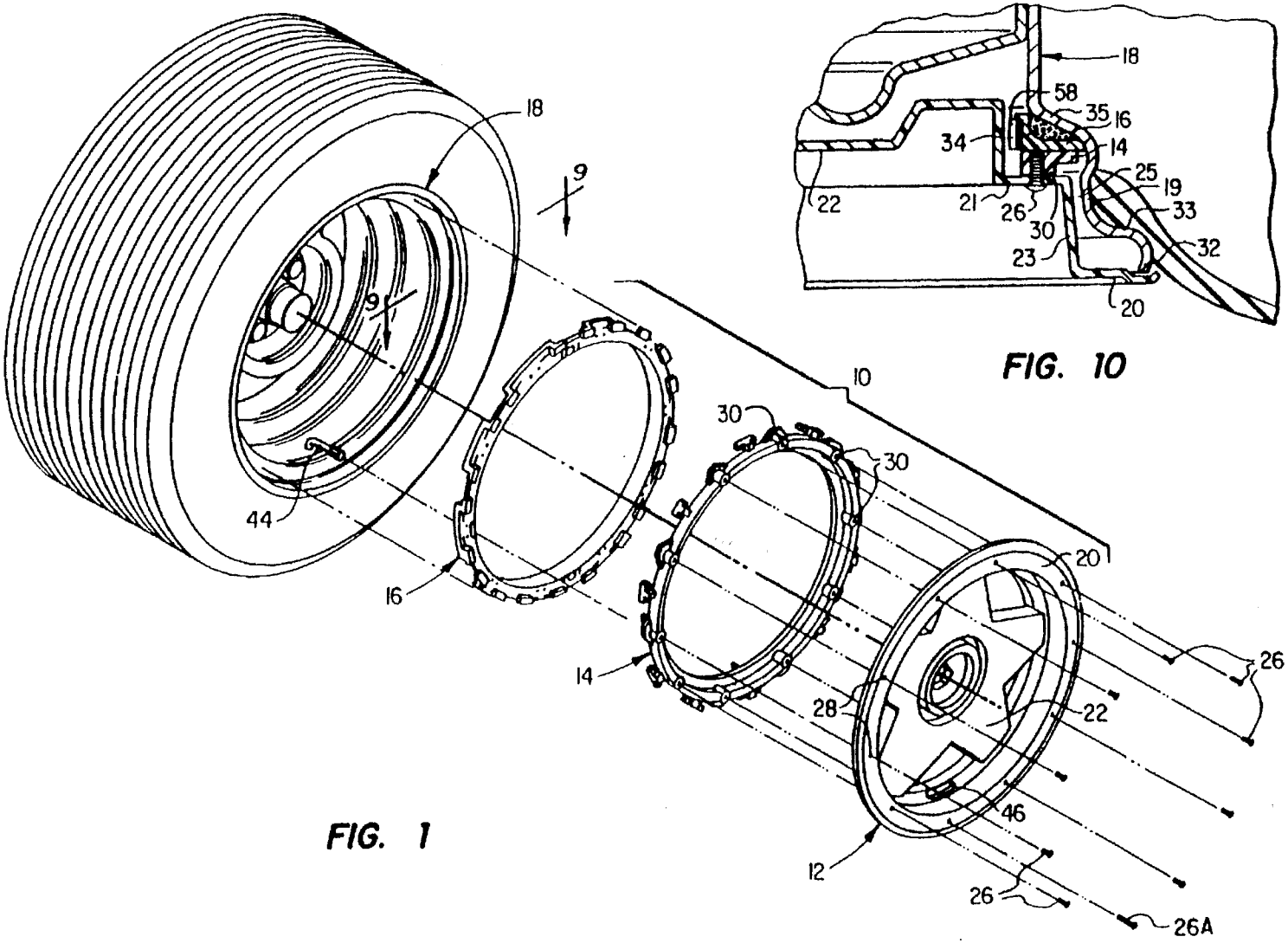
FIG. 1 is an exploded perspective view of an automotive wheel and the custom wheel-simulating wheel cover apparatus that embodies principles of the present invention.
FIG. 10 is an enlarged scale fragmentary cross-sectional view taken along line 9—9 of FIG. 1, revealing the automotive wheel and an alternative embodiment of the wheel cover apparatus in its assembled state.

First Embodiment:

Referring initially to FIG. 1, it is seen that simulated custom wheel apparatus 10, in a preferred embodiment thereof, consists essentially of three main components: a wheel cover member 12; a first ring member 14 (also referred to as the "retaining ring"); and a second ring member 16 (also referred to as the "bonding ring"). When assembled as illustrated and as described herein, simulated custom wheel apparatus 10 allows the user thereof to affordably and accurately simulate the appearance of an expensive custom wheel, utilizing a relatively inexpensive, ordinary automotive wheel 18.

Wheel cover member 12 is preferably molded or otherwise formed from a suitably rigid, impact resistant clear plastic. Wheel cover member 12 may be painted or molded in a plastic material of the desired color, or it may be formed from a metallic material and left completely or partially unpainted.

In the preferred embodiment shown, wheel cover member 12 includes a circular outer rim portion 20, integrally formed with contoured body portion 22. Radially and axially inward from outer rim portion 20 is inner rim portion 21, which is separated from outer rim portion 20 by radially facing annular wall 23. As illustrated, inner rim portion 21 generally defines the annular perimeter of contoured body portion 22.

The configuration and overall dimensions of the front side of wheel cover member 12 are substantially identical to the corresponding configuration and dimensions of a typical custom automotive wheel. The high degree of accuracy with which wheel cover member 12 duplicates the appearance of an actual custom wheel is due, in part, to the uniquely narrow width of outer rim portion 20, as compared to conventional wheel covers. The unique placement and operation of retention system 24 allows space 25, disposed between wall 23 and axially extending section 19 of wheel 18, to be minimized. Those skilled in the art will readily appreciate that the reduction in radial width of space 25 allows for a maximum diameter for body portion 22 and a minimum thickness for outer rim portion 20, thereby enabling wheel cover member 12 to quite accurately simulate a custom automotive wheel. It is expected that the actual configuration of wheel cover member 12 may be selected to simulate any number of custom wheel designs without departing from the scope of this invention.

Figure 2:
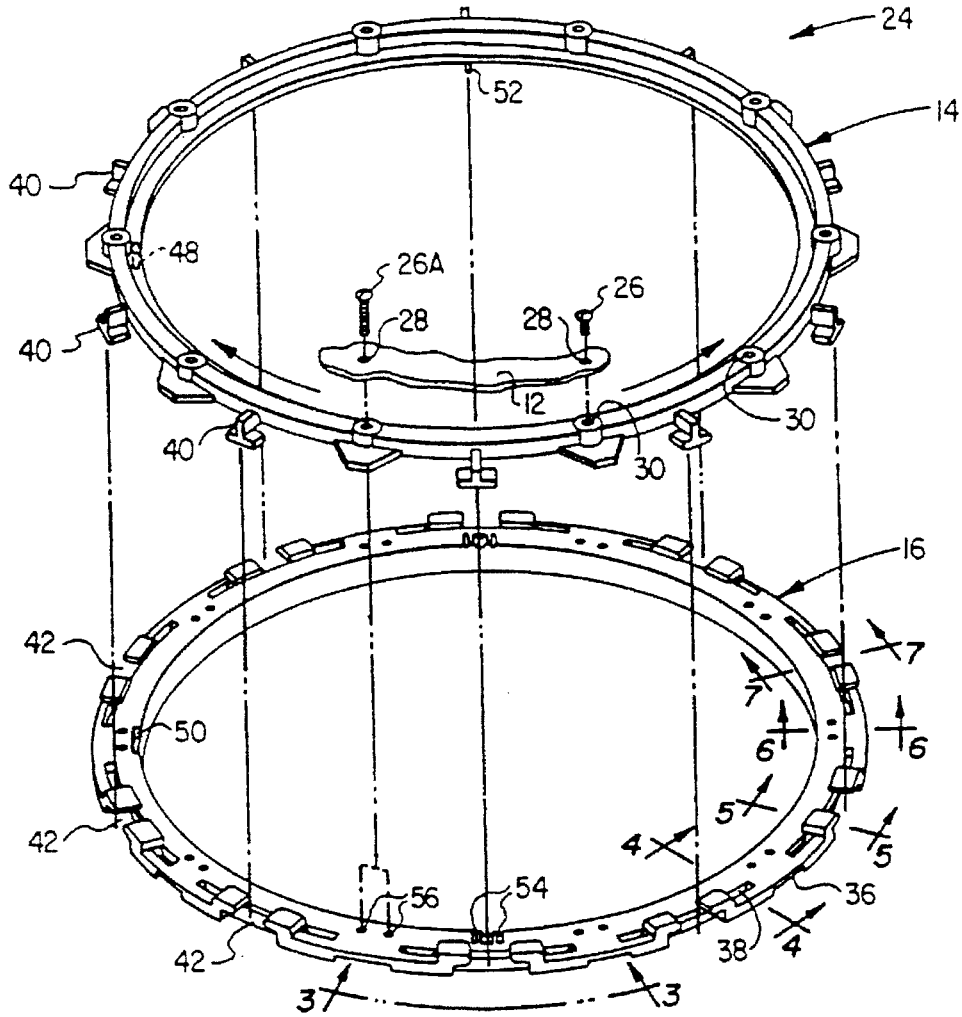
FIG. 2 is an enlarged scale exploded perspective view of the retention system for the steel cover apparatus for the present invention.

First ring 14 and second ring 16 generally constitute the unique retention system of this invention, designated generally by the numeral 24 in FIG. 2. First ring 14 is removably secured to outer rim portion 20 of wheel cover member 12 by screws 26. As best illustrated in FIG. 1, screws 26 pass through holes 28 in outer rim portion 20, and threadingly engage threaded bosses 30 which are integrally formed around the circumference of first ring 14. Screws 26 are generally of suitable length to engage, but not extend completely through, threaded bosses 30. It is contemplated, however, that at least one screw, designated locking screw 26a, be substantially longer than the remaining screws 26, thereby providing a locking feature described in more detail below.

Preferably, second ring 16 is permanently bonded to wheel 18, substantially adjacent and radially inwardly of outer peripheral edge 32, by adhesive 34. In order to increase the strength of the bond effected by adhesive 34, bonding ring 16 preferably includes recessed portions 36 and slots 38 into which adhesive 34 flows prior to final curing. In order to keep both weight and cost to a minimum, it is preferred that first ring 14 and second ring 16 be injection molded from suitable plastic material. In one embodiment, nylon may be selected for first ring 14, for its superior threading capabilities, while a suitable polycarbonate is used for second ring 16 due to its superior bonding characteristics. In another embodiment both rings are molded of a suitable polycarbonate, such as General Electric Company's trademarked "XENOY" which is understood to be a polycarbonate/polyester alloy.

Both of the rings have impact and chemical resistance and are resistant to temperature variation without undue softening or deformation and yet have flexibility. The bonding ring has the additional requirement that it be bondable, particularly with silicone rubber adhesive. It must be understood that loaded wheels subject to impact can sustain deformation of as much as a half an inch or more. Therefore, the rings and the adhesive should be able to give and spring back without cracking or loss of adhesive. It is contemplated, however, that many other materials may be equally well suited for the purposes described herein, particularly light weight metals. In the event that second ring 16 is made from metal, it is further contemplated that second ring 16 may be welded to wheel 18, thus eliminating the need for adhesive 34.

Figure 3:
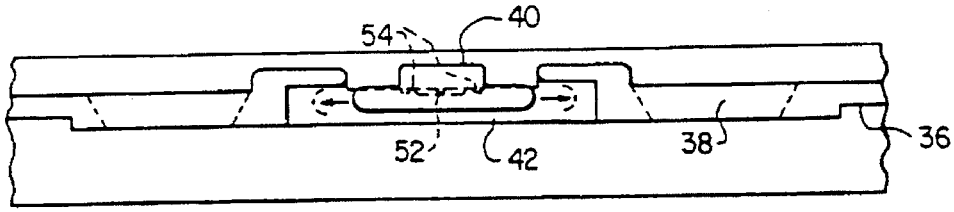
FIG. 3 is an enlarged scale elevational view, partially in phantom, of a circumferrential edge portion of the retention system, taken generally along line 3—3 of FIG. 2, showing the retention system in a partially assembled state.
Figure 4:
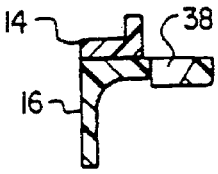
FIG. 4 is an enlarged scale cross-sectional view of the retention system taken along line 4—4 of FIG. 2, with the retention system in an assembled state.
Figure 5:
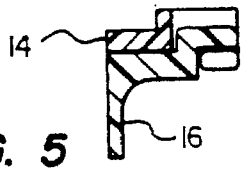
FIG. 5 is an enlarged scale cross-sectional view of the retention system taken along line 5—5 of FIG. 2, with the retention system in an assembled state.
Figure 6:
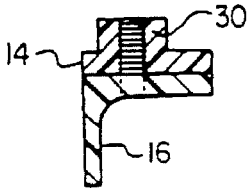
FIG. 6 is an enlarged scale cross-sectional view of the retention system taken along line 6—6 of FIG. 2, with the retention system in an assembled state.
Figure 7:
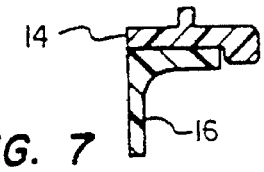
FIG. 7 is an enlarged scale cross-sectional view of the retention system taken along line 7—7 of FIG. 2, with the retention system in an assembled state.
Figure 8:
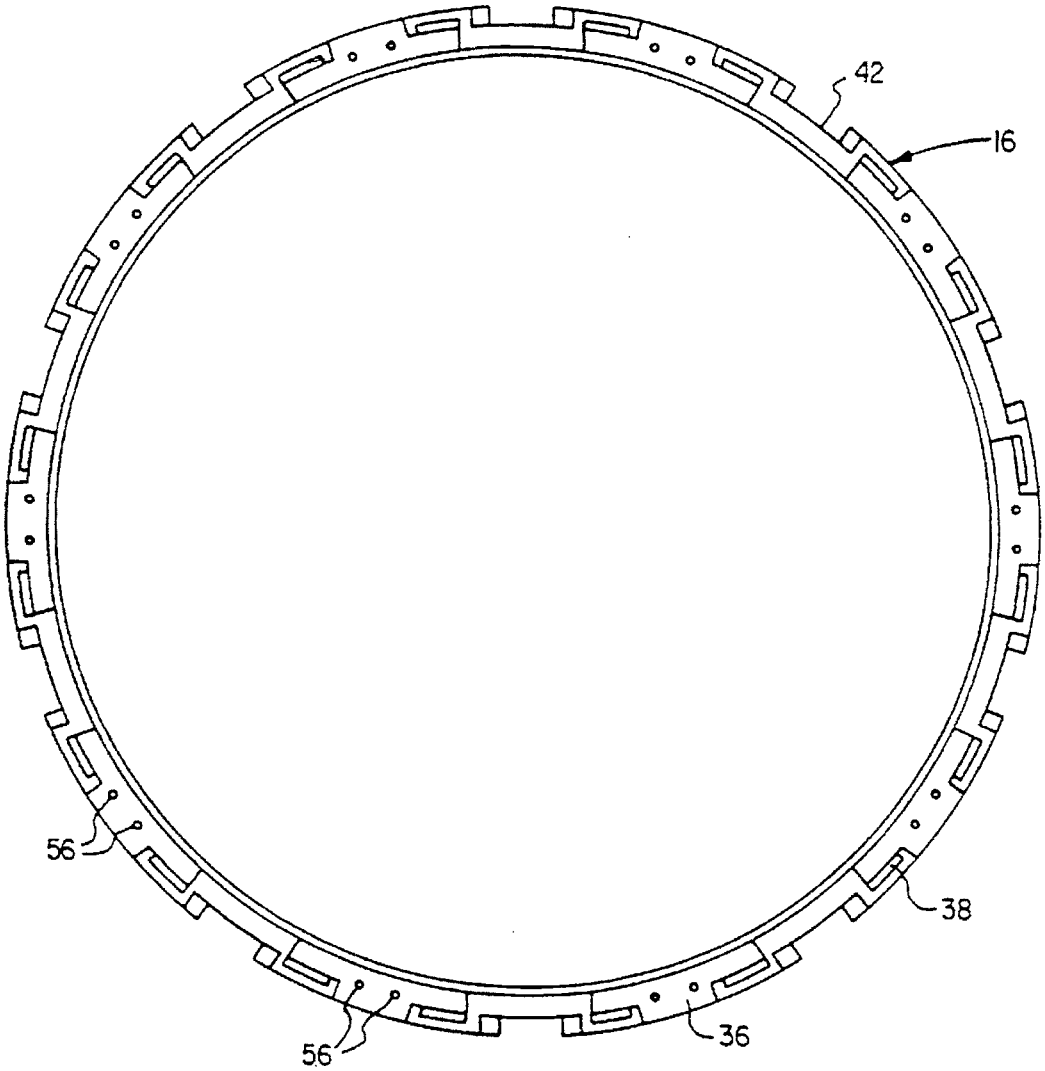
FIG. 8 is an enlarged scale rear side elevational view of the second ring member of the retention system.

Referring not to FIGS. 2 and 3, it is seen that first ring 14 includes a plurality of T-shaped lugs 40 extending therefrom, while second ring 16 includes an equal number of receptacles 42. The configuration of lugs 40 and receptacles 42 is such that lugs 40 may be inserted into receptacle 42, and engaged therewith in response to either clockwise or counter-clockwise rotation of first ring 14. Due to the unique, interlocking configuration of lugs 40 and receptacles 42, wheel cover member 12, with first ring 14 secured thereto, is easily securable to wheel 18 simply by aligning lugs 40 with receptacles 42, pressing wheel cover member 12 axially so that lugs 40 are inserted into receptacles 42, and slightly rotating wheel cover member 12 in either direction. Wheel cover member 12 is easily removable by equivalent counter-rotation to disengage lugs 40 from receptacles 42.

For certain configurations of wheel cover member 12, such as the embodiment illustrated herein, it is important that, upon securing wheel cover member 12 to wheel 18, valve stem 44 is accessible through opening 46. Therefore, in order to insure proper alignment of wheel cover member 12 and wheel 18, suitable alignment means may be provided with retention system 24. Accordingly, as shown in FIG. 2, retention system 24 is provided with alignment post 48 extending axially from first ring 14, and cavity 50 in second ring 16. In order to properly join first ring 14 to second ring 16 as described herein, alignment post 48 must be properly aligned with cavity 50. Therefore, during initial assembly of first ring 14 to wheel cover member 12, and second ring 16 to wheel 18, it is important that alignment post 48 be properly aligned with cavity 50 concurrently with valve stem 44 being accessible through opening 46.

In order to provide a positive "click" to denote that wheel cover member is properly in place with lugs 40 engaging receptacles 42, retention system 24 may include buttons 52 and detents 54, as shown in FIGS. 1, 2 and 3. (In FIGS. 1 and 2, buttons 52 are greatly exaggerated since they would not ordinarily be visible from the angle illustrated). Upon rotation of wheel cover member 12 in either the clockwise or counter-clockwise direction, buttons 52 snap over and are retained in position by detents 54. Thus, wheel cover member 12 is essentially "snapped" into position due to the interaction of buttons 52 with detents 54, while the frictional engagement of buttons 52 and detents 54 provides a degree of protection against inadvertent counter-rotation and subsequent removal of wheel cover member 12 from wheel 18.

If a higher degree of protection against inadvertent counter-rotation, or even theft, of wheel cover member 12 is desired, simulated custom wheel apparatus 10 may also include one or more locking screws 26a. As best illustrated in FIG. 2, second ring 16 includes a series of locking holes 56 formed therein, with locking holes 56 being carefully positioned so that they are in alignment with threaded bosses 30 upon the attachment of first ring 14 to second ring 16. Since locking screw 26a is longer than the depth of threaded bosses 30, it is necessary to partially unscrew locking screw 26a prior to assembly of wheel cover member 12 to second ring 16. Once wheel cover member 12 is properly snapped into place, locking screw 26a may then be fully inserted, so that its leading end passes through one of locking holes 56, thereby preventing the counter-rotation of wheel cover member 12 and first ring 14. After wheel cover member 12 has been snapped into place and locking screw 26a fully inserted, the outward appearance of locking screw 26a is virtually indistinguishable from the remainder of screws 26, so that a thief would be unable to tell which screw must be loosened in order to remove wheel cover member 12. As an additional degree of theft protection, the user of simulated custom wheel apparatus 10 could also employ a plurality of locking screws 26a, with only the user knowing the location of such screws.

Figure 9:
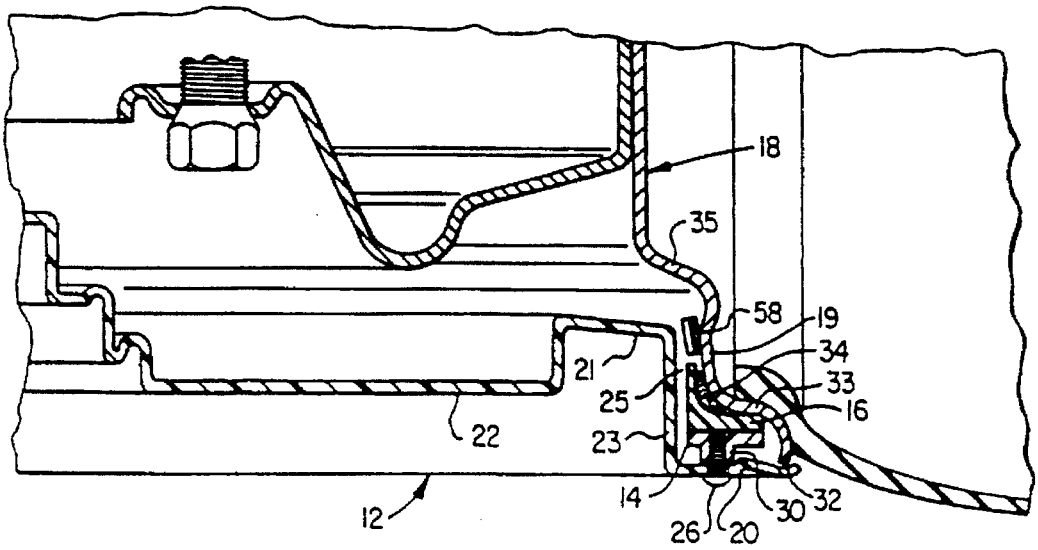
FIG. 9 is an enlarged scale fragmentary cross-sectional view through the automotive wheel and preferred wheel cover apparatus, taken along line 9—9 of FIG. 1, with the wheel cover apparatus shown in its assembled state.

FIG. 9 illustrates the inter-relationship of wheel cover member 12, first ring 14, second ring 16, and wheel 18 when these components are in their operative, fully assembly positioned. Another advantage of the present invention is that it allows the use of tape-type wheel weights 58 for balancing purposes. With most conventional wheel covers, space 25 is occupied by the conventional retention system. The unique placement of retention system 24, however, allows the convenient placement of weights 58 within space 25. Retention system 24 does not interfere with wheel weights 58 in their preferred position in space 25, as would many conventional retention systems, thus providing for accurate balancing of wheel 18 incorporating simulated custom wheel apparatus 10.

FIG. 10 illustrates an alternative embodiment for retention system 24, which is essentially identical to the preferred embodiment discussed above except for its radial placement. As illustrated, it is contemplated that second ring member 16 may be bonded or otherwise secured to inner annular ridge 35, instead of outer annular ridge 33 and is preferred. Similarly, first ring 14 may be secured to inner rim portion 21, rather than outer rim portion 20, for mating with second ring 16 in its alternative position. Those skilled in the art will appreciate that, with this embodiment it may be more convenient to secure wheel weight 58 directly to second ring 16 as shown. It will also be clear to those skilled in the art that the alternative embodiment will be preferable when certain types of custom wheels are to be simulated, particularly those custom wheels having screws disposed in the area of inner rim portion 21 rather than along outer rim portion 20.

Figure 11:
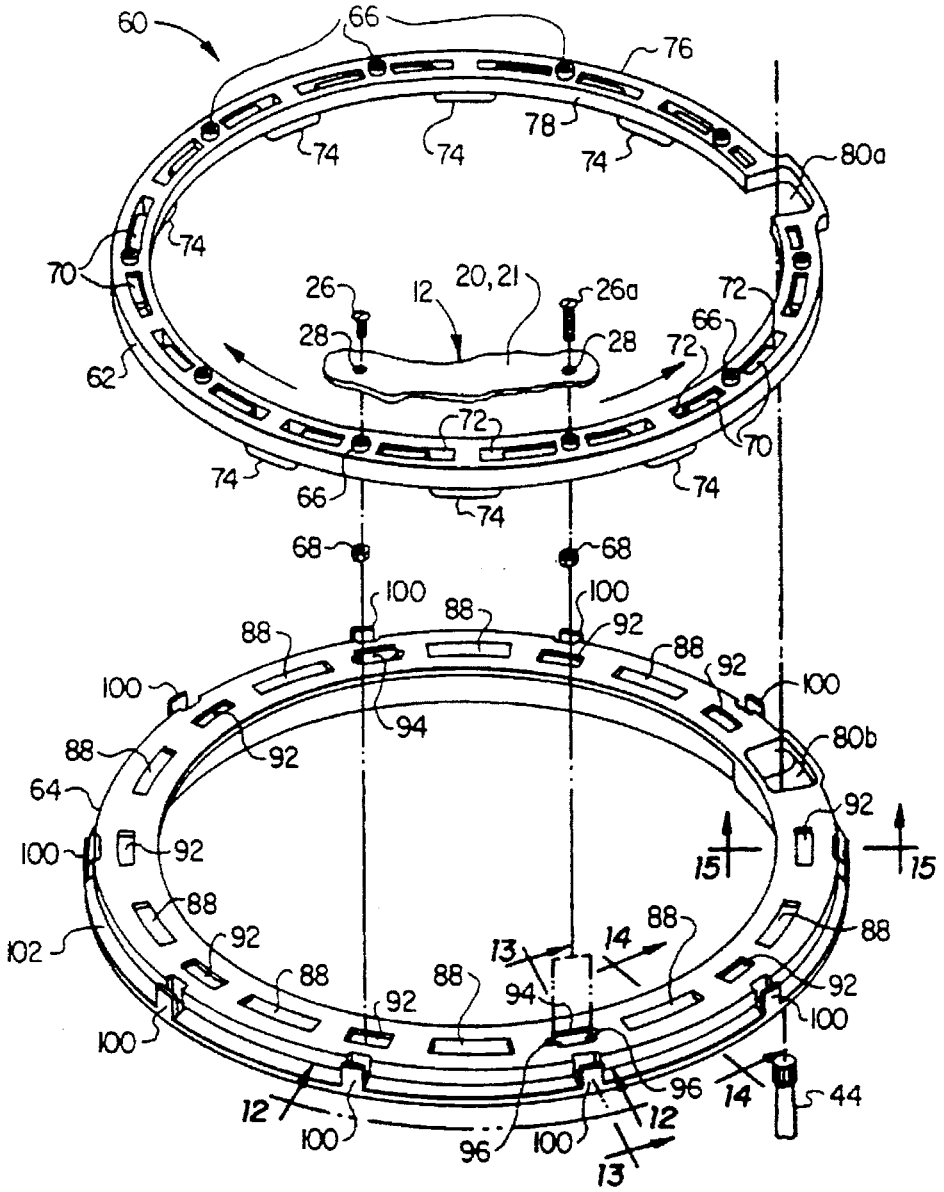
FIG. 11 is an exploded perspective view of an alternate form of the retention system.

Second Embodiment:

In FIGS. 11–17 is shown a preferred alternate embodiment of the retention system generally designated by the reference numeral 60 in FIG. 11. This includes a first engaging means 62. A portion of the same wheel cover member 12, as in previous figures, has openings for threaded fasteners 28 spaced around the flat portion of the circular outer rim 20, 21. Retention means 60 also includes second engaging means 64. First and second engaging means 62, 64 correspond respectively to first and second ring members 14, 16 in FIG. 1, and are adapted to mate together in concentric alignment.

Figure 13:
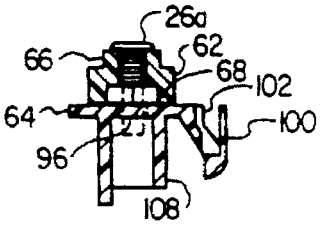
FIG. 13 is an enlarged scale cross-sectional view of the retention system taken along line 13—13 of FIG. 11, taken through a centering tab of a second ring member and showing a cover fastening screw in the mating first ring member.
Figure 15:
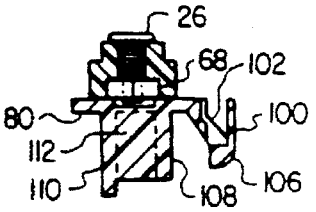
FIG. 15 is an enlarged scale cross-sectional view of the retention system taken along line 15—15 of FIG. 2, showing one of the periodic transverse stiffening members between annular rings which form the bottom of the second ring member.

First engaging means 62 is a ring member which has a plurality of spaced apart threaded bosses 66 centered around the upper or outer surface of the ring member. Wheel cover member 12 is secured to the outer surface of the first engaging means 62 by means of a plurality of threaded fasteners 26 which pass through the openings 28 in an outer rim portion 20, 21 of the cover member, and thence through openings in the plurality of spaced apart bosses 66 where they may be secured with nuts 68, in openings molded into the undersurface of engaging means 62. These nut receiving openings are in line with the openings in each of the spaced apart bosses 66. They receive nuts 68 flush with the bottom of the engaging means 62 as best indicated in FIGS. 13 and 15. Since threads are not used within openings in bosses 66 to engage the screws 26, the first ring member can alternately and preferably be made of the same polycarbonate as is used for the second ring member. At least one of the securing screws for the cover member is a locking screw or bolt 26a which may be secured to the second engaging means 64 in a manner to be described.

On either side of the bosses 66 are arcuate depressions 70 centered and spaced apart around the upper face of the retaining ring 62. At the ends of the depression 70, extending clear through the ring from the upper face to the lower face are openings 72. The openings and depressions define a post for each of a plurality of T-shaped lugs 74 projecting axially downward from the lower face of the ring 62. The posts are preferably centered between the outside circumference 76 and the inside circumference 78 of the ring itself. The depressions 70 and the openings 72 are primarily useful for injection molding purposes in order to achieve close tolerances and strength and aid in the formation of the integral lugs 74. They also have the effect of reducing the amount of material and weight of the circular ring structure. An opening 80a is provided to accommodate a valve stem 44 when the retention system is assembled.

Figure 12:
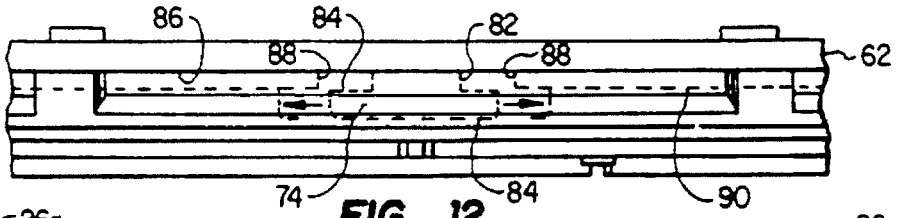
FIG. 12 is an enlarged scale elevational view, partially in phantom, of the alternate retention system assembly, taken generally along the line 12—12 of FIG. 11, showing the retention system in a partially assembled state.
Figure 16:
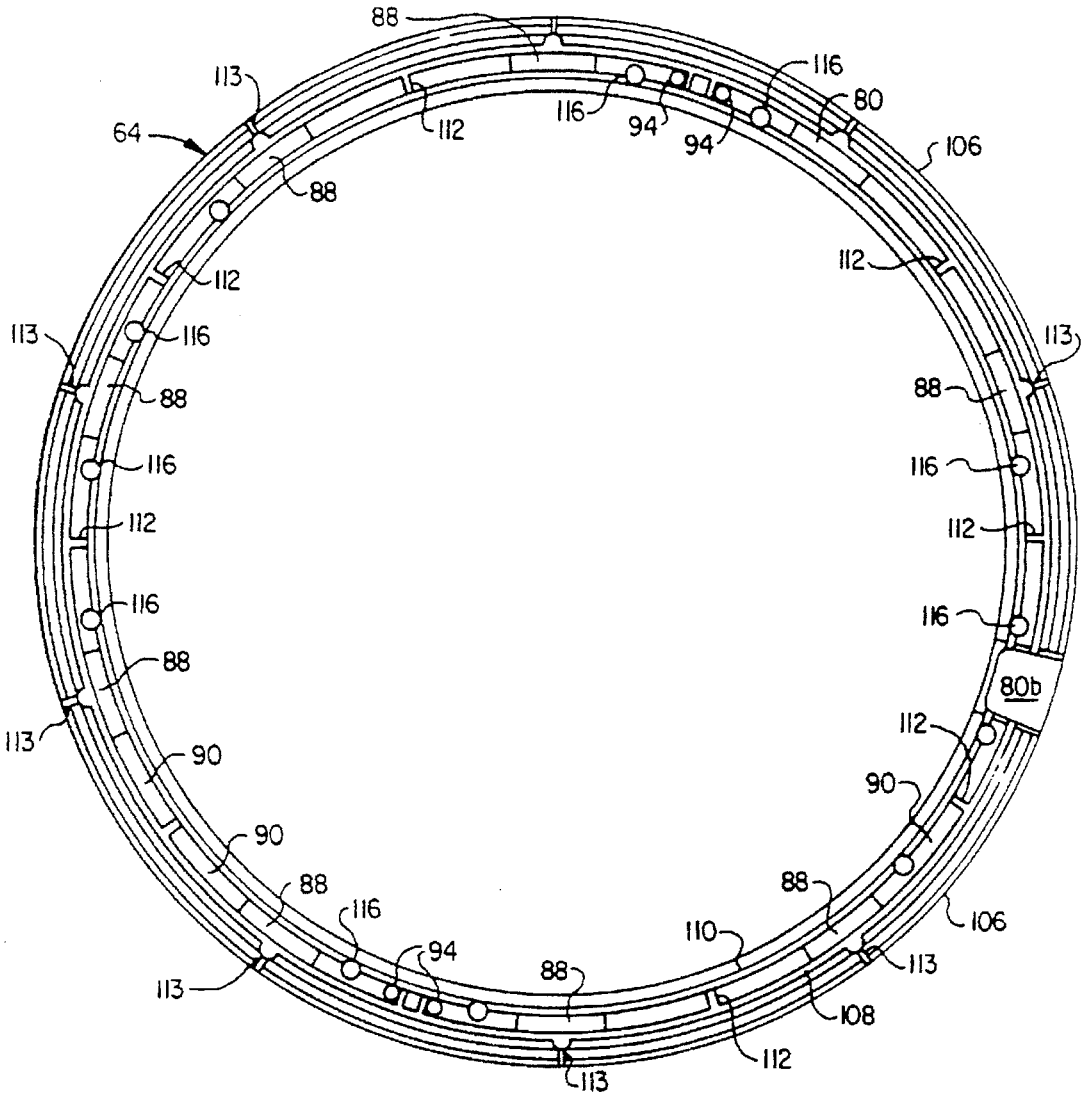
FIG. 16 is a bottom plan view showing the underside of the second ring member.

Seen in FIG. 12, T-shaped lugs 74 may be said to have a post portion 82 and post end portions 84 which stand off from the lower face 86 of the first engaging means 62 by a closely controlled distance. One of the end portions of these lugs will of course engage a cooperating receptacle slot of the other set of engaging means when they are placed in contact and rotated relative to each other. This is indicated by the arrows in FIG. 12. The upper side of the second engaging means 64 is also seen in FIG. 11 and the reverse lower side is seen in FIG. 16.

The ring 64 is provided with a plurality of arcuate substantially regularly spaced apart retention slots 88 which are adapted to cooperate with and receive the T-shaped lugs 74. Also provided is an enlarged valve stem opening 80b which is designed to stack in line with valve opening 80a of the ring 62 with the valve stem extending therethrough such that the rings can be rotated relative to each other without interference from the valve stem. The outer edge of the slots are better seen in FIG. 12. Thus, first engaging means 62 can be placed in concentric alignment with second engaging means 64 so that each of the slots receive and accept a T-shaped lug member 74 as indicated in FIG. 12. The dotted line 90 represents the thickness of the ring around the circumference between the slots and is generally uniform.

Figure 14:
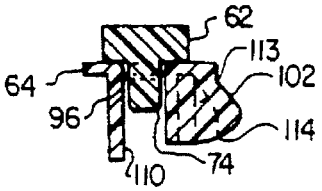
FIG. 14 is an enlarged scale cross-sectional view of the retention system taken along line 14—14 of FIG. 2, taken through a lug and cooperating slot with the two rings assembled and ready for rotational engagement.

Between the slotted lug receptacles 88 are elongated depressions 92 which are in line with the bosses 66 to accommodate the ends of screws 26 when the rings 62, 64 are mated in interlocking engagement. They are long enough to assure that the rotation necessary to lock the lug 74 under one of the ledges formed by the slots 88 is possible without interference. At least one depression 94 having at opposite ends thereof openings 96 is provided to serve as a locking means. Note that when the rings 62, 64 are brought together in mating interengaging relationship, the locking screw 26a, once the rings are rotated relative to each other into locking interengagement, is fastenable so that its long end extends into one of the openings 96. This prevents counter-rotation to unlock ring 62 from ring 64 until locking screw 26a is removed. This is indicated in FIG. 13 where screw 26a is seen passing through one of the bosses 66 and an opening 96. The openings 96 are so located that when the lugs 74 are rotated to an extreme position indicated by the dotted lines in FIG. 12, or counter-rotated to the opposite of said position, one of the holes 96 will be lined up with fastener 26a to lock the rings in that position. A second depression 94 diametrically opposed to the one shown in FIG. 13 may also be included so that an additional locking screw 26a might be used for locking. FIG. 14 indicates graphically that there must be a close fit at the location 98 where one of the ends 84 of lug 74 engaged the lower surface 90 of ring 62.

An important aspect of the retention system is the combination of a yieldable bonding ring having a side portion adapted to be permanently adhesively bonded to the annular wall portion of the automotive wheel by a flexible adhesive, such as a suitable silicone rubber adhesive. The adhesive bond and the rings can yield to conform with deflection of the wheel without failure of the adhesive bond. Silicone rubber adhesive offers a good bond between the bonding ring and the wheel which securely holds and remains elastic even over wide ranges of temperature exposure caused by ambient temperature or heat generated by the brakes of the car. Silicone rubber adhesive "sets" but does not harden in a way that would make it brittle or susceptible to cracking over time. The preferred adhesive is a "one-part" silicone rubber adhesive which is vulcanized at room temperature.

Figure 17:
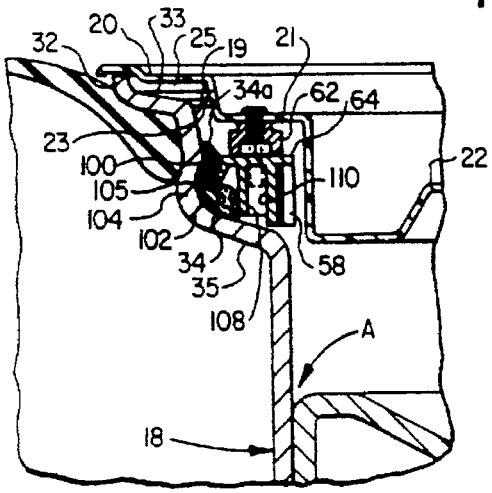
FIG. 17 is an enlarged scale fragmentary cross-sectional view through the automotive wheel and the alternate preferred wheel cover apparatus, taken along the line 9—9 of the wheel shown in FIG. 9, but with the alternate retention system of FIGS. 11–16 bonded to the bead lock area of the wheel in the assembled state.

Another important aspect of the present invention is the manner in which the adhesive is applied to the wheel to secure the bonding ring. This will be discussed in more detail hereafter. In fabricated wheels, such as rolled steel wheels, formation of the bead lock shape on the inside of the wheel results in a corresponding bead lock shape on the outer rim 18. FIG. 17 shows a cross-section through wheel 18 with the retention system secured to the wheel in the preferred area of bead lock 104. The bead lock includes a slight reverse curve providing an undercut portion 105. When the bonding ring 64 is affixed to the wheel, a bead of adhesive 34 is applied around the bead lock annular area 104 within which the bonding ring is set. The adhesive preferably flows into the undercut portion 104 of the bead of the rim, providing an extremely secure connection for the bonding ring when the adhesive has hardened. An additional bead ring of adhesive applied around the top edge of the bonding ring enhances the secure connection.

An additional feature of the present invention is a means for accurately centering the cover on the wheel. Spaced apart around the ring 64 on an annular axially depressed shelf 102 are a plurality of flexible self-centering tabs 100, best seen in FIGS. 11 and 13. The tabs are unitary with the ring itself which has the characteristic of flexibility. The use of the tabs can be seen in FIG. 17 wherein the tip end of the centering tab 100 is located at the narrowest part of the wall just above the undercut portion 105 of the bead lock 104. The annular shelf 102 is carefully dimensioned to a nominal dimension that will permit it to pass the narrowest constricted part of the wheel with a small amount of force. Normally, wheels from different manufacturers may vary from twenty to forty or fifty thousandths of an inch in diameter, in spite of the best attempts to control the diameter of that part of the wheel which holds the edge of the tire on the wheel. Bending the centering tabs outward all around the bonding ring 64 compensates for any discrepancies in diameter of the wheel. When the bonding ring is pushed down through the most constricted portion of the bead lock area of the rim, the tabs are naturally flexed inwardly and tend to center the bonding ring. As in FIG. 10, any tape-type wheel weights 58 are attached to the relatively flat innermost annular face of the bonding ring.

Since the dimensions of bead lock portion of the wheel are closely controlled for accuracy, centering the bonding ring on the bead lock insures that it will be centered on the tire. The bonding ring establishes the axial center of the retention system and the wheel cover member, so centering the bonding ring using tabs 100 insures that the cover member will run true when the wheel is rotating during use. A wobbling action or an off-center position of the wheel cover is unacceptable because it would destroy the illusion of an expensive custom wheel created by the special wheel cover in combination with the wheel cover retention system.

The reverse lower side of the second engaging means which extends axially downwardly from the lower surface 90 through its connection with the sloping shelf 102. An intermediate annular ring 108 also extends downwardly from the lower surface 90 and partly defines the receptacle slots 88. An inwardmost annular ring 110 also defines part of the slots 88, which are further defined by the undersurface 90 of the upper face of the bonding ring 64.

Spaced apart radially arranged stiffening walls 112 extend between the annular rings 108 and 110. A cross-section of one of these is seen in FIG. 15. Preferably offset from stiffeners 112 are another set of stiffeners 113 which extend between the annular rings 108 and 106 around the outer periphery of the lower side of the bonding ring 64. Stiffeners 113 merge with the rounded lower surface of the outermost stiffening ring 106 to form an arcuate surface 114 which constitutes positioning means for positioning the second engaging means in the same plane of rotation as the wheel. This prevents visible "wobble" of the decorative cover when the retention system is assembled. The positioning means is the actual surface on which the bonding ring rests in contact with a portion of the bead lock area 104 of the wheel when the bonding ring is installed. It is contoured to fit the curve of the wheel and, when pushed down through the bead of adhesive, provides a solid fixed position which assures that the bonding ring and the attached retention ring and wheel cover will run true without axial wobbling as the wheel rotates. The half circles at the inner ends of the stiffeners 113 represent molding sprues 116. Additional molding sprues 116 are seen around the circumference of the bonding ring 64 largely as a matter of molding practice to ensure uniformity.

Figure 18:
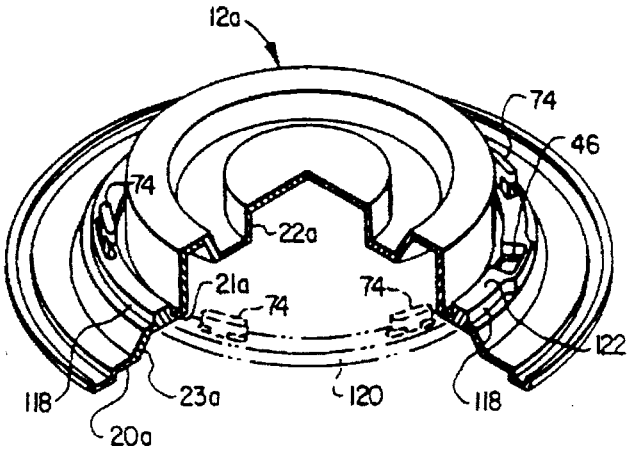
FIG. 18 is another alternate arrangement of the retention system wherein the cover member and the first ring member are of unitary integral construction.

In FIG. 18 is seen the reverse side of a modified wheel cover member 12a, the "a" signifying that it has the same essential figures as the wheel cover member 12. Wheel cover member 12a has a circular outer rim portion 20a and a contoured body portion 22a.

In the inner rim portion 21a is a retainer ring 118 which is molded into the cover member. Retainer ring 118 is an annular ring which extends from the inner rim portion 21a and is substantially equivalent to the retention ring 62. It includes a plurality of spaced apart lugs 74 which are sized and spaced to cooperate with and interengage with slots 88 in holding ring 64 by rotation in the same manner as does ring 62. The phantom portion 120 is meant to indicate a continuation of the annular ring 118 around the back side of the cover member where it is cut away for illustration. Retainer ring 118 contains the same valve stem opening 46 and being attached to the cover member, rotates with it to engage the holding ring 64 when the upper contact surface 122 is placed in contact with the upper or outer surface of holding ring 64 with the lug 74 engaged in the slots 88, and rotated to secure it in place. Retainer ring 118 differs from retainer ring 62 in that there is no need for the threaded bosses and screws because the cover member and retainer ring are joined to make one piece. One inobtrusive screw opening can be provided through retainer ring 118 which is engageable with one of the openings 94 in ring 64 so that once the ring is rotated to its locking position, it can be locked against counter-rotation which would be necessary to remove it.

The type of design shown in FIG. 18 is most appropriate for wheel covers which are opaque because the thicker portion where the retainer ring 118 is present tends to create a dark spot which can detract from the appearance. The back surface shown in FIG. 18 is referred to as a "second surface" which is protected on a wheel by the cover itself. The opposite or facing surface from that shown in FIG. 18 is referred to as the first surface, and if it is painted with an opaque, such as an aluminum color, then any extra thickness does not detract from the appearance.

A major benefit of the plastic wheel cover member 12 shown in the preceding FIGS. 1–17, in combination with the inventive retention system, is that it permits "second surface" painting. Molded polycarbonate "LEXAN" S100, a product of General Electric Company, is preferably used to form the cover member 12 and it is available with a highly glossy finish on the "first" surface, which is the surface seen when the cover is on the wheel. An opaque or translucent or combination of the two finishes can be applied on the second surface, which is the inside surface facing the wheel, opposite to the first surface. This finish is protected from chipping and scratching by the cover member itself and thus retains a new look much longer than if the paint was on the outside or "first" surface.

The retention system does not interfere with the appearance because the cover member 12 stands off on the bosses 30 and the headed end of the fasteners 26, 26a are preferably larger than the diameter of the bosses so that there are no dark spots which can occur by reason of variations in thickness which interfere with the reflection or transmission of light. Thus a uniform protected finish is available by means of "second surface" painting of the cover member which is not detracted from by the retention system.

Installation:

Installation of the foregoing retention system and wheel cover member is simply and easily accomplished without removing the tire from the wheel. The bead lock area of the wheel rim should be clean and free from rust or grease. In the case of some wheels which may have radially spaced openings inwardly from the area marked "a" in FIG. 17, it may be desirable to employ a deflector plate. A deflector plate is simply a flat, annular ring which may be set down in the wheel below the wheel cover member and retention system. This is accomplished by running a bead of silicone adhesive around the wheel rim in the area "A" and setting the deflector plate in place. The deflector plate is shaped to prevent light from passing through any openings in the wheel outwardly towards the wheel cover, but has a large enough opening in the center to avoid any interference with the wheel lug nuts. The deflector plate is not a necessary part of the retention system and would not be used in the case of ordinary solid wheel rims.

After testing the bonding ring 16, 64 to make sure it will fit into the bead lock area, a bead of adhesive 34 is applied around the bead lock area as indicated in FIGS. 9 or 10 in the case of bonding ring 16 or FIG. 17 in the case of bonding ring 64. The plurality of self-centering tabs 100 on ring 64 are bent outwardly approximately the same amount so that ring 64 will find its own center relative to the bead of the tire. Ring 64 is preferably made of a tough but flexible material such as "XENOY", No. 2230, from General Electric Company so that tabs 100 can be bent a substantial amount without breaking. Thus, even if the wheel is slightly oval-shaped, the tabs will tend to float ring 64 into a centralized position so that the wheel cover will rotate about the same central axis of rotation as the wheel.

Next, the valve stem is placed through the valve stem opening in the bonding ring and the bonding ring is pressed straight down into the bead of silicone adhesive. The valve stem should project from the center of the valve stem hole. A thin bead of silicone adhesive 34a is then laid around the wheel at the top edge of the bonding ring to help secure the bonding ring in place.

The cover member is secured to the retention ring 14, 62 on the bosses and secured by the plurality of screws 26, leaving an opening for at least one locking screw 26a. The valve stem is lined up with the valve stem opening in the retaining ring 14, 62 and through the cover member 12, 12a and the retention ring is mated with the bonding ring so that the lugs are in the receptacles or slots ready to engage by rotation. The cover member is then rotated preferably counterclockwise if the wheel is on the driver's side of the car, or clockwise if the wheel is on the passenger side of the car. This engages the plurality of lugs and slots and secures the retention ring and cover to the bonding ring. Finally, at least one locking screw 26a is placed through the cover member and retention ring and secured in one of the openings 94 in ring 64 or a comparable locking hole 56 in bonding ring 16. This prevents any further rotation so that the wheel cover cannot be removed without removing the locking screw. Removal of the wheel cover is simply a matter of removing the locking screw and rotating the cover member and retaining ring so that the lugs are no longer caught by the edge of the receptacles or slots and pulling it straight away from the wheel.

As mentioned above, it is preferred that wheel cover member, first ring, and second ring be formed from plastic material suitable for the purpose. In addition to keeping the cost and weight of the invention to acceptable levels, plastic materials also provide a higher degree of flexibility for this invention than exhibited by conventional wheel covers, particularly in the construction of the retention system. Moreover, this invention includes a tough and flexible adhesive for bonding the retention system to the wheel. Thus, the entire apparatus has the ability to bend and flex with the wheel under extreme circumstances, such as unusually hard cornering or when encountering a large bump or hole in the road surface. The present invention is able to remain intact under circumstances which would cause a conventional wheel cover to be severely damaged or through off and possibly lost.

Althouth the preferred embodiment of this invention has been described in detail, as well as certain alternative embodiments, it should be understood that various other changes, substitutions and alterations can be made therein without departing from the spirit and scope of the invention as defined by the appended claims.

I claim:

1. A retention system for removably securing a decorative wheel cover to an original equipment steel automotive wheel, the wheel cover having an annular rim portion and the automotive wheel having an annular wall portion with an annular bead lock area along the annular wall portion, said retention system comprising:

second engaging means comprising a bondable member having a side portion adapted to be positioned and be permanently adhesively bonded at the bead lock area of the annular wall portion of said automotive wheel, said bondable member including means for releasable engagement with a retainer member;

first engaging means comprising a retainer member having an outside surface for securing a decorative wheel cover, the wheel cover being securable to said outside surface of the retainer member along said annular rim portion of the wheel cover, said retainer member including means for releasable engagement with the means for releasable engagement of said bondable member whereby the first and second engaging means may be interengaged;

wherein said wheel cover is secured to the wheel by adhesively bonding said bondable member at the annular bead lock area along the annular wall portion of said wheel and the retainer member being removably secured to the bondable member upon interengagement of said first and second engaging means.

2. The retention system of claim 1 wherein the bondable member is a yieldable rigid plastic member suitable for being permanently adhesively bonded at the annular wall of said wheel by means of a bead of flexible adhesive on said annular wall at said bead lock area in contact with the side portion of said bondable member.

3. The retention system of claim 2 wherein the side portion of the bondable member for contact with said flexible adhesive has one or more adhesive receiving depressions for enhancing a bond.

4. The retention system of claim 2 wherein the bondable member has a plurality of positioning means on said side portion for orienting said bondable member in operative position against the bead lock area of the annular wall of said wheel while being secured thereto by said adhesive, to position the bondable member for uniformity of rotation with the wheel.

5. The retention system of claim 4 further including said original equipment steel automotive wheel and a first bead of flexible adhesive disposed between the side portion of said bondable member and the bead lock area of the wheel for permanently adhesively securing said bondable member to the wheel.

6. The retention system of claim 5 and further including a second bead of flexible adhesive disposed at or just above the bead lock area along a peripheral side portion of said bondable member, opposite said side portion in contact with the wheel, to enhance the bond securing the bondable member to the wheel.

7. The retention system of claim 5 wherein said flexible adhesive is a suitable silicone rubber adhesive.

8. The retention system of claim 1 further including a decorative wheel cover carried by said retainer member and securable in operative position with said first and second engaging means interengaged.

9. The retention system of claim 9 further including releasable locking means to selectively retain said retainer member and said bondable member in operative engagement with each other.

10. The retention system of claim 7 wherein said retainer member and said bondable member are respectively first and second annular rings which are held in contact by said means for releasable engagement of said first and second engaging means.

11. The retention system of claim 10 wherein said side portion of the bondable member for contact with said flexible adhesive has a plurality of adhesive receiving depressions for enhancing a bond.

12. The retention system of claim 4 wherein the bondable member has a plurality of flexible self centering means on said side portion for orienting said bondable member in operative position against the bead lock area of the annular wall of said wheel while being secured thereto by said adhesive to center the bondable member on the axis of rotation of the wheel.

13. A retention system for removably securing in operative position a decorative wheel cover having an annular rim portion to an original equipment type steel automotive wheel, said retention system comprising:

an original equipment type steel automotive wheel having an annular outer peripheral edge portion, an annular wall portion radially inward from said outer peripheral edge portion and an undercut bead lock;

a band of flexible adhesive disposed at least partially in the bead lock area around the annular wall portion of the automotive wheel and positioned for bonding a side portion of a bonding member in operative position thereto;

a bonding member having a side portion adapted for bonding with said band of flexible adhesive, being permanently bonded at said side portion by said adhesive being at least partially located in the undercut portion of the bead lock of the annular wall portion of said automotive wheel;

a retainer member having an outside surface face for securing the decorative wheel cover thereto in operative position on the wheel, the wheel cover being securable along said annular rim portion to the outside surface of the retainer member; and said bonding member and said retainer member having cooperating means for releasable engagement whereby said retainer member with or without the decorative wheel cover secured thereto, can be releasably interengaged with the bonding member which is permanently bonded to the automotive wheel with said band of flexible adhesive.

14. The retention system of claim 13 and further including a second band of flexible adhesive disposed along a second side portion of said bonding member and in contact with a portion of the annular wall portion of the wheel to enhance the bonding connection between the wheel and the bonding member.

15. The retention system of claim 13 further including releasable locking means to selectively retain said retainer member and said bonding member in operative engagement with each other.

16. The retention system of claim 13 further including a decorative wheel cover carried by said retainer member and secured in operative position by said retainer member on said automotive wheel.

17. The retention system of claim 13 wherein said bonding member is a yieldable rigid plastic and said flexible adhesive is silicone rubber.

18. The retention system of claim 13 wherein said retainer member and said bonding member are respectively first and second annular rings which are held in mating contact by said cooperating means for releasable engagement.

19. The retention system of claim 18 wherein said annular rings are yieldable rigid plastic and said flexible adhesive is silicone rubber.

20. A combined retention system and decorative cover for removably securing an integrally molded decorative wheel cover having annular inner and outer rim portions to an ordinary automotive wheel having an annular outer peripheral edge portion and an annular wall portion radially inward from said outer peripheral edge portion, said retention system comprising:

integrally molded decorative wheel cover and first engaging means extending along one of said inner or said outer rim portions of said decorative wheel cover;

second engaging means comprising a ring member having a first portion for engagement to said first engaging means and a second portion adhesively securable against the annular wall portion of said automotive wheel;

said first and second engaging means being cooperative for releasable engagement by placing said first engaging means in contact with the first portion of said second engaging means with the second portion of the second engaging means adhesively secured to the annular wall portion of said wheel and engaging the first and second engaging means to thereby secure the decorative wheel cover to the wheel.

21. The combined retention system and decorative cover apparatus of claim 20 wherein said ring member has means for self-centering said ring member in operative position against the annular wall portion of said wheel.

22. The combined retention system and decorative cover apparatus of claim 21 wherein the ring member is strengthened by a plurality of downwardly extending concentric annular rings which include means for positioning the ring member parallel to a plane of wheel rotation so that when assembled the retention system has no visible wobble.

23. The combined retention system and decorative cover apparatus of claim 22 wherein the plurality of concentric downwardly extending annular rings include a concentrically innermost ring having an arcuate surface for securing wheel weights.

24. The combined retention system and decorative cover apparatus of claim 22 wherein the ring member has an annular peripheral lower edge portion which includes means for self-centering said ring member with respect to the axis of rotation of said wheel so that when assembled the retention system appears to rotate on the same axis as the wheel.

25. A retention system for removably securing a decorative wheel cover having annular inner and outer rim portions to an ordinary automotive wheel having an annular outer peripheral edge portion and an annular wall portion radially inward from said outer peripheral edge portion, said retention system comprising:

first engaging means securable along one of said inner or said outer rim portions of said decorative wheel cover;

second engaging means comprising a ring member having a first portion for engagement to said first engaging means and a second portion adhesively securable against the annular wall portion of said automotive wheel, the ring member having means for self-centering said ring member in operative position against the annular wall portion of said wheel wherein said means for self-centering said ring member comprises a plurality of flexible self-centering tabs radially arranged around the annular peripheral edge of the ring members; and said first and second engaging means being cooperative for releasable engagement by placing said first engaging means in contact with the first portion of said second engaging means, with the second portion of the second engaging means adhesively secured to the annular wall portion of said wheel to thereby secure the decorative wheel cover to the wheel when the wheel cover is attached to said first engaging means.

26. A method of installing a removable decorative wheel cover having an annular rim portion, a contoured body portion and an integral retainer ring, to a bondable member secured to the bead lock area of an original equipment steel automotive wheel having a rim, an annular wall portion radially inward from the rim and a bead lock area on the annular wall portion suitable for bonding with an adhesive, comprising:

providing a yieldable rigid annular bondable member having a facing surface, a releasable retention means carried by the facing surface, and a peripheral edge portion adapted to fit against and be bonded at the bead lock area of said wheel;

applying a bead of flexible adhesive to the bead lock area of the annular wall portion of the wheel;

pressing at least the peripheral edge of the yieldable rigid bondable member into said bead of adhesive to install and secure the bondable member at the bead lock area of the annular wall portion of said wheel, with the releasable retention means of said bondable member positioned outwardly;

providing a decorative wheel cover having an annular outer rim adapted to be substantially coextensive with the wheel rim, a contoured central body portion and an integral yieldable rigid retainer member having releasable retention means adapted for releasable interengagement with the releasable retention means of the installed bondable member;

placing said decorative wheel cover in operative position on the wheel with the releasable retention means of the retainer member located adjacent the releasable retention means of the bondable member; and engaging the releasable retention means of the bondable member with the releasable retention means on the yielding rigid retainer member to secure the wheel cover to the wheel.

27. The method of claim 26 further comprising the step of locking said releasable retention means of the bondable member and integral yieldable rigid retainer member.

28. The method of claim 26 wherein the pressing step involves pressing a bondable member molded from plastic and the engaging step involves engaging an integral decorative wheel cover and retainer member being a ring member molded from plastic.

29. The method of claim 28 wherein the adhesive applying step applies silicone rubber adhesive.

30. The method of claim 26 wherein the adhesive applying step includes a bead of adhesive applied substantially all around the bead lock area of the annular wall portion of the wheel and the bondable member comprises a ring member having said peripheral edge portion, the pressing step including setting the peripheral edge portion into the bead of adhesive all around the annular wall portion of the wheel.

31. The method of claim 30 wherein the step of pressing the ring member in the adhesive bead includes forcing arcuate portions of the peripheral edge portion of the ring member into positioning contact with the annular wall portion of the wheel.

32. The method of claim 30 wherein the step of pressing the peripheral edge portion of the bondable member into the bead of adhesive includes the step of simultaneously centering the bondable member on the axis of wheel rotation with the aid of a plurality of self-centering tabs and positioning means.

33. The method of claim 26 wherein one of the releasable retention means of the bondable member and the retainer member comprise a plurality of lugs and the other comprise a plurality of cooperating slots and the step of engaging the releasable retention means includes positioning said plurality of lugs within said plurality of slots.

34. A method of installing a retention system for a removable decorative wheel cover to an ordinary automotive wheel, the wheel cover having an annular rim portion and the automotive wheel having an annular wall portion with a bead lock portion within said annular wall being suitable for bonding with an adhesive, comprising:

applying a bead of flexible adhesive at least partially in said bead lock portion of the said annular wall portion of the wheel;

providing a yieldable rigid bondable member in the form of a second ring member having a first side portion having a peripheral edge just smaller than the diameter of the bead lock, said bondable member having a second engaging means along a second side portion positioned oppositely from said first side portion;

pressing the first side portion of the bondable member into the bead of adhesive at the bead lock portion of the wheel, to permanently adhesively bond the bonding member therein;

providing a retainer member for a decorative wheel cover, the retainer member having a first engaging means for releasably engaging the second engaging means of the bondable member;

securing the decorative wheel cover centered on said retainer member; and interengaging the first engaging means of the retainer member with the second engaging means of the bondable member to secure said decorative wheel cover in centric relationship with the rotational axis of the wheel.

35. The method of claim 34 wherein the bead lock portion of the wheel has an undercut portion and the adhesive applying step includes applying said adhesive therein, to enhance a secure connection between said wheel and said bonding member.

36. The method of claim 34 further including the step of laying a second band of flexible adhesive around the upper side portion of said bonding member and in contact with a portion of the wheel to enhance the bonding connection between the wheel and the bonding member.

37. The method of claim 36 wherein at least the bead of adhesive in contact with the first side portion of the bonding ring is silicone rubber.

38. A method of installing a removable decorative wheel cover having annular inner and outer rim portions to an ordinary automotive wheel having an annular outer peripheral edge portion and an annular wall portion radially inward from side outer peripheral edge portion, comprising:

providing a wheel having an annular wheel wall portion suitable for bonding with an adhesive; applying a bead of adhesive to a selected portion of the annular wall portion of the wheel;

providing a second engaging means;

setting the second engaging means in the bead of adhesive on the annular wall portion of the wheel;

providing a decorative wheel cover having on an annular rim portion a first engaging means releasably engageable with said second engaging means when said first engaging means is placed in contact with said second engaging means and rotated;

placing said first engaging means in contact with said second engaging means with said wheel cover in operative position on said wheel; and rotating said decorative wheel cover to interengage said first and second engaging means and hold the wheel cover in place.

39. The method of claim 38 further comprising the step of: locking said first and second engagement means.

40. The method of claim 38 wherein the first and second engaging means are molded from plastic.

41. The method of claim 38 wherein the bead of adhesive is applied substantially all around the annular wall portion of the wheel and the second engaging means comprises a first ring member having a lower surface which is set in the adhesive.

42. The method of claim 41 wherein the step of setting the first ring member in the adhesive includes portions of the ring member being in positioning contact with the annular wall portion of the wheel.

43. The method of claim 41 wherein the step of placing said first engaging means in contact with said second engaging means and the step of rotating to interengage said first and second engaging means may be accomplished prior to securing said decorative wheel cover to said first engaging means.

44. The method of claim 41 wherein the second engaging means comprises a plurality of slots and the first engaging means comprises a plurality of cooperating lugs, said lugs being adapted to be received in and releasably held by said slots, wherein said step of placing said first engaging means in contact with said second engaging means causes said lugs to be received in said slots.

45. The method of claim 44 wherein the step of rotating causes edges of said slots to be interengaged by edges of said lugs.

46. The method of claim 45 further comprising a locking step after said rotating step.

47. A method of installing a retention system for a removable decorative wheel cover to an ordinary automotive wheel, the wheel cover having an annular rim portion and the automotive wheel having an annular wall portion being suitable for bonding with an adhesive, comprising:

applying a bead of flexible adhesive at least partially in said bead lock portion of the said annular wall portion of the wheel;

providing a yieldable rigid bondable member in the form of a second ring member having a first side portion having a peripheral edge just smaller than the diameter of the bead lock, said bondable member having a second engaging means along a second side portion positioned oppositely from said first side portion;

pressing the first side portion of the bondable member into the bead of adhesive at the bead lock portion of the wheel, to permanently adhesively bond the bonding member therein;

providing a retainer member for a decorative wheel cover, the retainer member having a first engaging means for releasably engaging the second engaging means of the bondable member;

interengaging the first engaging means of the retainer member with the second engaging means of the bondable member to secure said retainer member in centric relationship with the rotational axis of the wheel; and securing a decorative wheel cover centered on said retainer member.

*48. A retention system for securing a wheel cover to an automotive wheel, the wheel cover having an annular rim portion and the automotive wheel having an annular wall portion extending from an outer peripheral edge portion with an annular under cut area along the annular wall portion, said retention system comprising:*

*a mating member having a circumferential side portion adapted to be positioned and fixedly secured to the annular wall portion of said automotive wheel, said mating member including a first releasable engagement member;*

*a retaining member to be fixed to the wheel cover along said annular rim portion of the wheel cover, said retaining member releasably engaging said first releasable engagement member of the said mating member;*

*a resilient ring of soft material extending about the circumference of said mating member at the annular wall portion of the wheel securing said mating member to the wheel with said retaining member being removably secured to the mating member upon interengagement of said releasable engagement member;*

*a decorative wheel cover secured to said retaining member and securable in an operative position with said retaining member engaged with said mating member, said decorative wheel cover including a back side secured to said retaining member and including a circular annular rim portion and*

*fastening means for securing said wheel cover to said retaining member.*

*49. A system as set forth in claim 48 wherein said wheel cover is integral with said retaining member.*

*50. A system as set forth in claim 48 wherein said retaining member comprising a first ring member having an outer periphery, said first ring member being formed from a general rigid material attached to said back side of said circular outer rim portion of said wheel cover member, said first ring member including a plurality of said second releasable engagement members.*

*51. A system as set forth in claim 48 wherein said mating member comprises a second ring member having an outer periphery, said second ring member being formed from a generally rigid material and being adapted for attachment radially inwardly of said outer peripheral edge portion thereof; said second ring member including a plurality of said first releasable engagement members integrally formed therewith axially outwardly from said outer periphery and being disposed in a spaced apart relationship along said outer periphery of said second ring member.*

*52. A system as set forth in claim 51 wherein said first and second releasable engagement members include means for locking upon relative rotation.*

*53. A system as set forth in claim 48 wherein said retaining member comprises a first ring member securable to said back side of said circular outer rim potion of said wheel cover.*

*54. A system as set forth in claim 53 wherein one of said first and second ring members including a plurality of lugs formed therein and extending therefrom and the other of said first and second ring members having a plurality of receptacles formed therein to receive said lugs interlocking engagement upon relative rotation of said first and second ring members.*

*55. A system as set forth in claim 48 wherein said resilient ring of soft material connects said mating member to the wheel at the under cut area.*

*56. A retention system for removably securing a wheel cover having annular inner and outer rim portions to an automotive wheel having an annular wall portion about the circumference thereof, said retention system comprising:*

*retainer member adapted to be secured to the wheel cover;*

*mating member comprising a yieldable rigid ring member having a circumference about an annular peripheral edge including a first portion for engagement with said retainer member and a second portion securable against the annular wall portion of said automotive wheel, said retainer member and said mating member being engageable and disengageable in response to relative rotation of the retainer member and said mating member;*

*said ring member including a plurality of individual flexible tabs radially extending from said ring member and about said circumference for self-centering said ring member in an operative position against the annular wall portion of said wheel about the circumference of the annular peripheral edge of said ring member while maintaining the circumference of said mating member.*

*57. A system as set forth in claim 56 further including a substantially continuous ring of resilient material for securing said mating means to the annular wall at an under cut area.*

*58. A method of installing a removable decorative wheel cover having an annular rim portion, a contoured body portion and a retainer member, to a mating member secured to an automotive wheel having a rim, an annular wall portion radially inward from the rim and an undercut area on the annular wall portion, the method including the steps of:*

*providing a yieldable rigid annular mating member having a facing surface, a releasable retention member carried by the facing surface, and a peripheral edge portion adapted to fit against and be secured at the annular wall of said wheel;*

*placing a ring of flexible material to the annular wall portion of the wheel;*

*pressing the peripheral edge of the yieldable rigid mating member against the ring of flexible material to install and secure the mating member against the annular wall portion of said wheel, said the releasable retention member of said mating member positioned outwardly;*

*providing a wheel cover having an annular outer rim adapted to be substantially coextensive with the wheel rim, a contoured central body portion and a yieldable rigid retainer member having releasable retention member adapted for releasable interengagement with the releasable retention member of the mating member;*

*placing said wheel cover in operative position on the wheel with said releasable retention member of the retainer member located adjacent the releasable retention member of the mating member; and*

*engaging the releasable retention member of the mating member with the releasable retention member on the yieldable rigid retainer member to secure the wheel cover to the wheel.*

*59. A method as set forth in claim 58 further including rotating said decorative wheel cover with respect to the mating member to interengage the retainer member with the mating member and hold the wheel cover in place.*

*60. A method as set forth in claim 58 further including placing the ring of flexible material at the under cut area of the annular wall portion of the wheel and securing the mating member at the under cut area.*

*61. A retention system for removably securing a wheel cover having an annular outer rim portion to an automotive wheel having an annular wall portion and an outer peripheral edge portion, said system comprising:*

*a retaining member secured to said annular outer rim portion of the wheel cover;*

*a mating member comprising a circular member extending adjacent and inwardly of the annular wall portion of a wheel and adapted to be secured to the wheel inwardly of the outer peripheral edge portion of the wheel and positioned between said retaining member and the wheel when the wheel cover is placed in its operative position within the wheel;*

*said mating member including first and second annular rings connected at one side by a mating ring, said mating ring including interlocking engagement means being engageable and disengageable from said retaining member, and including stiffening walls extending between said first and second annular rings at spaced intervals.*

*62. A retention system for removably securing a wheel cover having a circular outer rim portion to an automotive wheel having a circular wall portion and an outer peripheral edge portion, said system comprising:*

*a retaining portion secured to the circular outer rim portion of the wheel cover;*

*a mating member comprising a circular member extending adjacent and inwardly of the circular wall portion of a wheel and adapted to be secured to the wheel inwardly of the outer peripheral edge portion of the wheel and positioned between said retaining portion and the wheel when the wheel cover is placed in its operative position within the wheel;*

*said retaining portion and said mating member having interlocking engagement means for releasable engagement with one another when said mating member is secured to the wheel and mated with said retaining portion having the wheel cover secured thereto and located in its operative position, said retaining portion and mating member being engageable and disengageable in response to rotation of said wheel cover relative to the vehicle wheel;*

*said mating member having an opening receiving a valve stem of the vehicle wheel therethrough,*

*said retaining portion including an elongated aperture therein aligned with said opening of said mating member receiving the valve stem and allowing rotation of said retaining portion without interference with the valve stem.*

*63. A retention system for removably securing a wheel cover having an annular outer rim portion to an automotive wheel having an annular wall portion and an outer peripheral edge portion, said system comprising:*

*a retaining portion secured to the annular outer rim portion of the wheel cover;*

*a mating member comprising a circular member extending adjacent and inwardly of the annular wall portion of a wheel and adapted to be secured to the wheel inwardly of the outer peripheral edge portion to the wheel and positioned between said retaining portion and the wheel when the wheel cover is placed in its operative position within the wheel;*

*said retaining portion and said mating portion having interlocking engagement means for releasable engagement with one another when said mating portion is secured to the wheel and mated with said retaining portion having the wheel cover secured thereto and located in its operative position, said retaining portion and mating member being engageable and disengageable in response to rotation of said wheel cover relative to the vehicle wheel;*

*one of said retaining portion and said mating member including detent members interacting between said retaining portion and said mating member to snap into engagement upon relative rotation in a first direction of said retaining portion in a first direction of said retaining portion and said mating member locking said apparatus in the rotated position and to disengage upon manual rotation in a direction opposite said first direction so that said interlocking engagement means are engaged upon a first portion of rotation in said first direction and are further engaged along with said detent members snapping into engagement upon a further rotation in said first direction.*

*64. A system as set forth in claim 63 wherein the other of said retaining portion and said mating member includes buttons for engagement with said detent members for snapping engagement to lock said retaining portion to said mating member.*

*65. A retention system for securing a wheel cover to an automotive wheel, the wheel cover having an annular rim portion and the automotive wheel having an annular wall portion extending from an outer peripheral edge portion with an annular under cut area along the annular wall portion, said retention system comprising:*

*a circular mating member having a circumferential side portion extending adjacent the wheel adapted to be positioned and fixedly secured along the annular wall portion of said automotive wheel, said mating member including a first releasable engagement member;*

*a retainer member to be fixed to the wheel cover along said annular rim portion of the wheel cover, said retainer member including a second releasable engagement member to releasably engage with said first releasable engagement member of the said mating member;*

*a resilient ring of adhesive extending about the circumferential side portion of said mating member at the annular wall portion of the wheel securing said mating member to the wheel with said retainer member being removable secured to the mating member upon interengagement of said releasable engagement members.*

*66. A system as set forth in claim 65 wherein said mating member includes a yieldable rigid annular member having a peripheral edge portion adapted to fit against and be secured at the annular wall of the wheel.*

* * * * *